United States Patent [19]

Buschmann et al.

[11] Patent Number: 5,029,949
[45] Date of Patent: Jul. 9, 1991

[54] CIRCUIT CONFIGURATION FOR A BRAKE SYSTEM COMPRISING AN ANTI-LOCKING CONTROL

[75] Inventors: Gunther Buschmann, Griesheim; Paul Schwarzer, Hofheim, both of Fed. Rep. of Germany

[73] Assignee: Alfred Teves GmbH, Frankfurt am Main, Fed. Rep. of Germany

[21] Appl. No.: 344,783

[22] Filed: Apr. 28, 1989

[30] Foreign Application Priority Data

May 7, 1988 [DE] Fed. Rep. of Germany ....... 3815732

[51] Int. Cl.$^5$ .......................... B60T 8/82; B60T 8/32
[52] U.S. Cl. .................................. 303/96; 188/181 C;
303/97; 303/98; 303/100
[58] Field of Search .................................. 303/91–119;
188/181 C; 180/197; 364/426.01, 426.02

[56] References Cited

U.S. PATENT DOCUMENTS

| | | | |
|---|---|---|---|
| 3,535,004 | 10/1970 | Howard et al. | 303/96 |
| 3,917,353 | 11/1975 | Swiden et al. | 303/106 |
| 3,980,350 | 9/1976 | Öberg | 303/106 X |
| 4,005,910 | 2/1977 | Leiber et al. | 303/96 |
| 4,374,421 | 2/1983 | Leiber | 303/96 X |
| 4,643,485 | 2/1987 | Leiber | 303/97 X |
| 4,679,866 | 7/1987 | Zanten et al. | 303/109 X |
| 4,715,662 | 12/1987 | Zanten et al. | 303/109 |
| 4,765,430 | 8/1988 | Schulze et al. | 303/97 |
| 4,790,606 | 12/1988 | Reinecke | 303/104 |

Primary Examiner—Douglas C. Butler
Attorney, Agent, or Firm—Robert P. Seitter; J. Gordon Lewis

[57] ABSTRACT

A circuit configuration for a brake system including an anti-locking control system, wherein a balanced pressure course is attained in the rear wheel brakes through control according to the "select-low" principle. The circuit configuration is furnished with a supplemental circuit (8) comparing the rotating pattern of the rear wheels during the control and, upon detection of a brake moment difference ($\Delta M$) causes a brake moment correction. This correction can be achieved, for example, by prolongating ($T_p$, $T'_p$) of the pressure build-up pulses controlling the rise in pressure in the wheel exhibiting a lower brake moment.

7 Claims, 1 Drawing Sheet

CIRCUIT CONFIGURATION FOR A BRAKE SYSTEM COMPRISING AN ANTI-LOCKING CONTROL

BACKGROUND OF THE INVENTION

The present invention relates to a circuit configuration for a brake system including an anti-locking control, wherein a balanced brake pressure is attainable in the rear wheel brakes through control according to the select-low principle, that is, in response to the rear wheel which is the first to show a locking tendency.

As is well known, an anti-locking control system (ALC) is intended to preclude, in panic decelerations or on slippery roads, a locking of the wheels in order to maintain driving stability and steerability of the automotive vehicle. In the event of locking rear wheels, the driving stability is subject to swerving, whereas in the event of locking front wheels, the steerability of the automotive vehicle is lost. However, in order to attain a short stopping distance, the brake pressure through the anti-locking system is reduced just to an extent preventing the wheel from locking and enabling it to absorb sufficient lateral forces. As the lateral forces which a wheel is able to absorb rapidly decrease with an increasing brake slip and as a excessively low lateral stability of the rear wheels involves the danger of swerving, a control of the brake pressure in the rear wheel brakes according to the select-low principle has proved to be satisfactory and is commonly used in modern brake systems. According to this principle, the rear wheels are always decelerated with the same pressure determined by the "low" wheel, that is, by the rear wheel exhibiting the poorer road contact, and, therefore, being the first wheel tending to lock. The "high" rear wheel, hence, normally receives a slightly lower brake pressure than it could handle in view of the locking tendency. This wheel is, therefore, capable of transferring a relatively high lateral force.

A disadvantage involved with the select-low principle is that the high wheel, the brake pressure of which is not determined by its own rotating pattern but rather by the low wheel, does not contribute enough to deceleration if—for example due to a poor bleeding condition, a low pad friction coefficient etc.—the brake moment, in response to the brake pressure, is substantially lower than the one on the second rear wheel. With an equal friction coefficient in righ/left and straight-forward driving, a brake moment difference (which may be substantial) always will occur which in unfavorable circumstances, results in a stopping distance larger than required. Unfavorable conditions of this type are especially encounted in snow and ice conditions and at a relatively high load on the rear axle as compared with that on the front axle, that is, in situations in which deceleration is required over a relatively extended period of time.

It is the object of the present invention to overcome the disadvantages described and to provide a circuit configuration ensuring the advantages involved with a select-low control on the rear wheel with no need for accepting a high brake moment difference in unbalanced conditions of the rear wheel brakes in the described situations.

SUMMARY OF THE INVENTION

It has been found that this problem can be solved with a circuit configuration of the described type if the circuit configuration contains an additional circuit comparing the rotating pattern of the rear wheels during control and, upon detecting of criteria typical for a continuous brake moment difference on the rear wheels, causing a brake pressure and hence a brake moment adjustment.

Basically, the select-low principle is, hence, maintained in the circuit configuration of the present invention, and the advantages provided by that principle are utilized. However, inadvertent brake moment differences on the rear axle are balanced by correspondingly increasing the brake pressure on the "under-decelerated" wheel thereby attaining a relatively short stopping distance in all situations in which the share of the rear axle in the decelerating process is high.

According to an advantageous embodiment of the circuit configuration of the present invention, the supplement circuit compares the slip and/or decelerating and accelerating pattern, respectively, on the rear wheels, and analyzes the pattern to detect a brake moment difference. If, for example, a rear wheel, during a decelerating process permanently remains in the stable area whereas, on the second rear wheel, the brake pressure is permanently controlled by the ALC-system, a relatively high brake moment difference can result which reduces stopping distance. The supplemental circuit according to the present invention will start to operate, causing an increase in the brake pressure in the wheel brake of the permanently stable rear wheel and, hence, a brake moment adjustment. A brake moment adjustment of this type can be attained, for example, by additional brake pressure control pulses, by extending the duration of one or pre-determined brake control pulses, etc. When detecting yawing moments or cornering, the brake moment adjusting circuit according to the invention can be de-actuated. The same applies when detecting different friction coefficients on the right-hand and left-hand sides of the automotive vehicle.

BRIEF DESCRIPTION OF THE DRAWING

Further advantages, details and applications of the present invention will become better understood from the following detailed description with reference to the accompanying drawing, wherein.

DETAILED DESCRIPTION

According to the present invention the brake moment balance between the two rear wheels particularly during a "select-low" slip control operation. That is, even though equal or a predetermined difference in brake pressure may be applied and modulated during slip control, the rear wheels may nevertheless rotate at different deceleration speeds. This is due to mechanical differences between the two rear wheel systems and results in undesirable brake moment differences between the two wheels as discussed above. The present invention overcomes this problem by first detecting the rotating pattern of each rear wheel. The two patterns are then compared in a control circuit to ascertain whether a deceleration speed and therefore brake moment difference of a predetermined duration exsts. If such a difference is detected, the control circuit provides output signals to modulate the brake pressure valves of one of the rear wheels so as to equalize wheel deceleration characteristics, and therefore the brake moments, of the rear wheels. Accordingly, the advantages of a select-low control system are essentially fully attained and undesired differences in the brake moments of the rear wheels are avoided.

Figure 1:
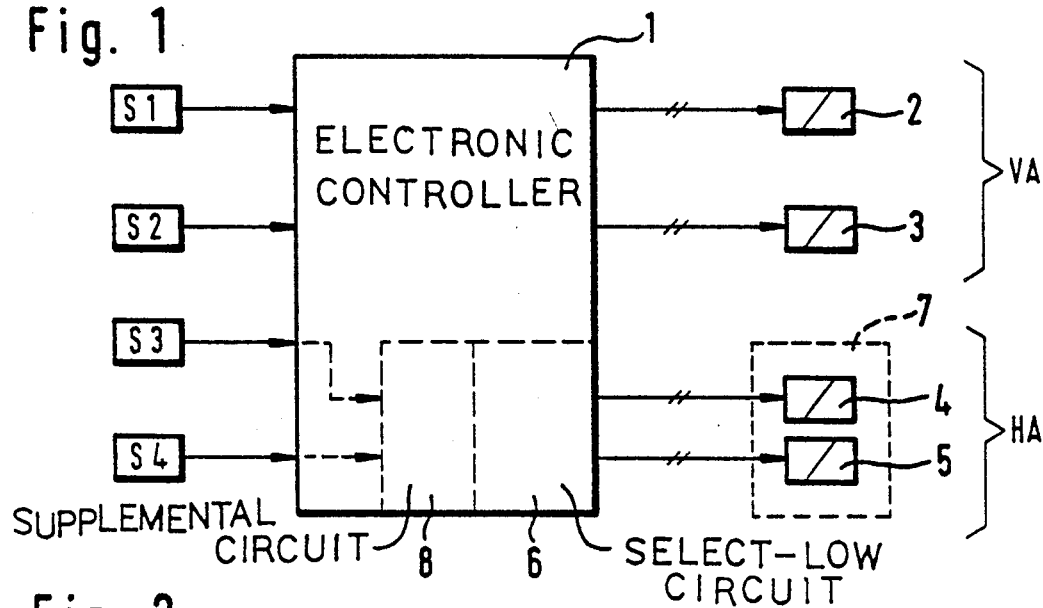
FIG. 1 schematically shows the basic principle of a circuit configuration for controlling a brake system comprising an anti-locking control according to the present invention.

FIG. 1 shows the basic design of a circuit configuration for controlling an anti-locking-controlled brake system. Each wheel includes a sensor S1–S4 generating a signal in proportion to the wheel speed and to the wheel rotating pattern, which signal is supplied to an electronic controller 1. The major components of this controller 1 are electronic circuits for logically combining and processing the sensor signals. Controller 1 may contain one or more micro-computers. The output signals of controller 1 control modulators or valve means 2–5 which, in hydraulic brake systems, are seated in the pressure fluid conduits leading from a pedal-actuated brake pressure generator or master cylinder to the individual wheel brakes and/or from the wheel brakes to a pressure balancing reservoir. The valve means 2–5 respectively associated with each wheel are, for example, made up of valve pairs, including a so-called inlet valve controlling the pressure fluid flow down to the wheel brake, and an outlet valve, through which pressure fluid can be discharged into a relief reservoir for decreasing the pressure.

One pair of valves 2, 3 independently controllable of the respectively other valve pair, respectively is associated with the two wheels of the front axle, whereas the two other valve pairs 4, 5 leading to the wheels of the rear axle HA, are excited through a "select-low" circuit 6 forming a component part of the electronic unit of controller 1. Framing 7 of the two valve pairs 4, 5 shown in broken lines, symbolizes that the brake pressure and the brake pressure course are logically combined by the "select-low" condition. Despite the co-phasal control according to the "select-low" principle, these brake systems will always require two valve pairs 4, 5 where the wheel brakes are connected in diagonal relationship to two hydraulically separated brake circuits, which is frequently used in modern systems.

Figure 2:
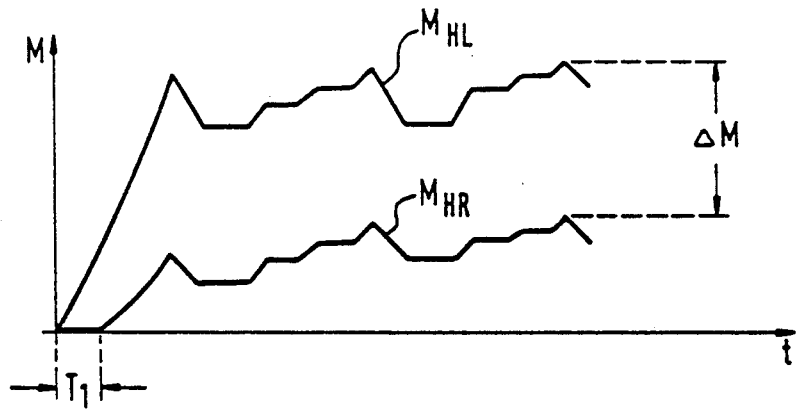
FIG. 2 shows the brake moment course on the rear wheels in a conventional select-low control; and, FIG. 3 shows, in an illustration essentially identical to that of FIG. 2, the brake moment course, using the cicuit configuration of the present invention.
Figure 3:
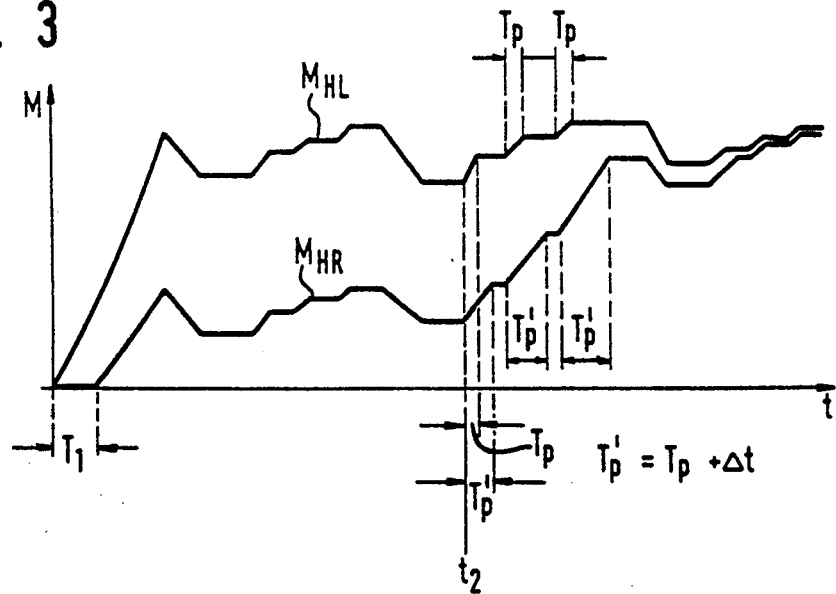

In the practice of the present invention, a supplemental circuit 8 is provided which, as set out hereinafter with reference to FIG. 2 and FIG. 3, compares the rotating pattern of the rear wheels during a control to perform a brake moment adjustment upon detection of a behavior typical for brake moment differences on the rear wheels.

FIG. 2 shows the situation and the brake condition, respectively, in which the technical advance provided by the present invention is realized. FIG. 2 shows the course of the brake moment $M_{HL}$, $M_{HR}$ on the left-hand rear wheel HL and on the right-hand rear wheel HR, respectively, during a controlled deceleration. Although the controller adjusts the brake pressure on the rear axle according to the "select-low" principle thereby ensuring that the brake pressure course and the brake pressure level are identical in both rear wheel brakes, the brake moments $M_{HL}$ and $M_{HR}$ on the two rear wheels substantially differ, with the difference amounting to $\Delta M$. The brake pressure course and the control, in the present example, are determined by the left-hand rear wheel HL. A substantially lower brake moment develops on the right-hand rear wheel HR which may be due, for example, to dead-time differences ($T_1$) when applying the brake lining; to a different pad friction coefficient, or to poor bleeding of the wheel brake of the right-hand rear wheel HR.

A circuit configuration according to the present invention including a supplemental circuit for effecting a brake moment adjustment, results in the course of the brake moments on the two rear wheels and the desired brake moment adjustment, respectively, as shown in FIG. 3. At the time $t_2$, the supplemental circuit 8 (see FIG. 1) determines from the wheel rotating pattern of the two rear wheels, which is detected by sensors S3, S4, that the brake moments on the two rear wheels continue to substantially differ. The yawing moment circuit and the cornering detection circuit of controller 1 (not shown) do not generate a detecting signal. Further, no differing right/left friction coefficient exists at this time. Consequently, the brake moment difference $\Delta M$ (see FIG. 2) is due to a different condition or different adjustment of the rear wheels brakes. The supplemental circuit 8 of controller 1, therefore, causes a prolongation of the pulse duration $T_P$ of the pressure build-up pulse commencing at time $t_2$, thereby prolongating the build-up pulse on the right-hand rear wheel by the period of time $\Delta t$ resulting in a corresponding prolongation of the rise time of the brake moment $M_{HR}$ according to FIG. 3. The pressure build-up pulses continue to exhibit the length $T_P$ for the left-hand rear wheel and on the right-hand rear wheel HR are increased to the duration $T'_P$ until the brake moment difference has been overcome and an approximately balanced brake moment $M_{HL}$, $M_{HR}$ has occurred on the two rear wheels.

In place of the uniform prolongation of the succeeding pressure build-up pulses, it also is possible to choose an (even more extended) prolongation of each first pulse of the pressure build-up pulse sequences or the suppression of the subsequent pressure decrease pulses, etc. A rapid brake moment correction and balancing the brake moment difference $\Delta M$, respectively, is desirable although a slow correction and resulting balance also is advantageous because especially in relatively extended decelerating processes such as in snow and glaze conditions, the brake moment increase on the otherwise "under-decelerated" second rear wheel nevertheless would come into play and be of importance.

In the practice of the present invention, a simple supplemental circuit will substantially improve the "select-low" control which is known to be of advantage for driving stability. The additional effort required is readily attainable particularly if the controller contains micro-computers, as the function of the additional circuit is realizable by a small number of additional program steps.

What is claim is:

1. A method for providing an anti-locking control system for the brakes of an automotive vehicle wherein braking pressure is applied to the rear vehicle wheels and modulated by slip control using the select-low technique, said method comprising the steps of:

detecting the rotating pattern of each rear wheel;
  determining the brake moment of each rear wheel respectively from the detected rotating patterns;
  comparing the determined brake moments;

detecting a difference between the brake moments; and altering the brake pressure modulation pattern of one of the rear wheels in response to the detecting difference until the brake moments are approximately equal.

2. The method according to claim 1 including the step of delaying said altering step for a predetermined period after said difference is detected.

3. The method according to claim 1 wherein said altering step includes the step of delaying altering until a predetermined difference value is attained.

4. The method according to claim 1 wherein the brake pressure is applied to the rear vehicle wheels through control valves responsive to a controller.

5. The method according to claim 4 wherein said control valves are electromagnetic valves responsive to electrical signals provided by said controller.

6. The method according to claim 5 wherein during slip control said controller provides pulses of constant pulse duration.

7. The method according to claim 6 including the step of prolonging the duration of the pulses applied to one of said electromagnetic valves after said brake moment difference has been detected.

* * * * *